United States Patent [19]

Hegler et al.

[11] 4,319,467
[45] Mar. 16, 1982

[54] UNIVERSAL JOINT SEAL VENT

[75] Inventors: Gary G. Hegler, Chesaning; Kenneth L. Westercamp, Saginaw, both of Mich.

[73] Assignee: General Motors Corporation, Detroit, Mich.

[21] Appl. No.: 135,485

[22] Filed: Mar. 31, 1980

[51] Int. Cl.$^3$ .............................................. F16D 3/84
[52] U.S. Cl. ..................................... 64/32 R; 64/21; 64/8; 277/29
[58] Field of Search ................... 64/32 R, 32 F, 21, 8, 64/7; 277/29, 154

[56] References Cited

U.S. PATENT DOCUMENTS

| | | | |
|---|---|---|---|
| Re. 30,606 | 5/1981 | Sharp | 64/8 |
| 1,747,529 | 2/1930 | Place | 64/32 R |
| 2,510,362 | 6/1950 | Anderson | 64/32 F |
| 2,910,845 | 11/1959 | Wahlmark | 64/21 |
| 3,017,756 | 1/1962 | Sharp | 64/32 R |
| 3,452,558 | 7/1969 | Cull et al. | 64/32 R |
| 3,858,412 | 1/1975 | Fisher et al. | 64/21 |
| 4,027,927 | 6/1977 | Turner | 64/21 |

*Primary Examiner*—Ira S. Lazarus
*Assistant Examiner*—Magdalen Moy
*Attorney, Agent, or Firm*—F. J. Fodale

[57] ABSTRACT

A universal joint has a housing which includes an attachment bore which opens into a housing chamber via a counterbore at the inner end of the attachment bore. A seal vent subassembly has an outer rim press which is fitted in the counterbore to form an outer vent chamber which is intersected by a vent hole which extends through the housing wall. The seal vent includes a seal disc which seals the inner end of the attachment bore and a vent disc forms an inner vent chamber in conjunction with the seal disc. The vent disc has a hole establishing communication between the housing chamber and the inner vent chamber, and the rim has holes establishing communication between the inner vent chamber and the outer vent chamber.

5 Claims, 5 Drawing Figures

U.S. Patent     Mar. 16, 1982     4,319,467
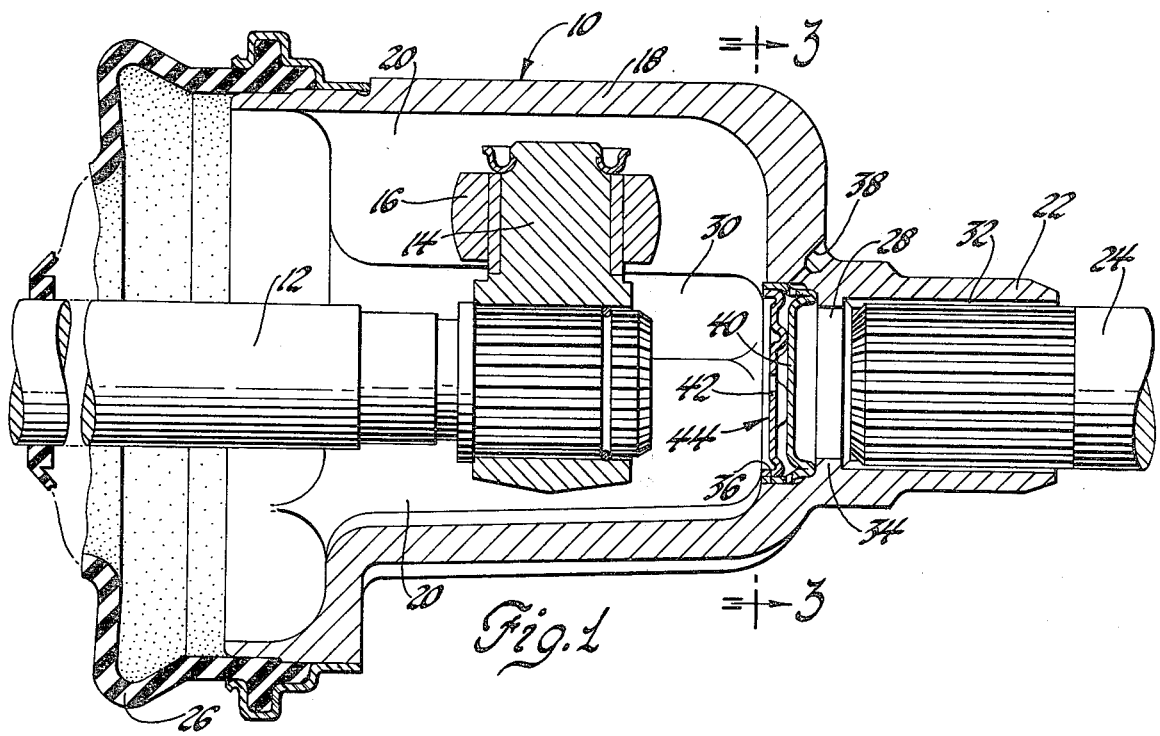
Fig.1
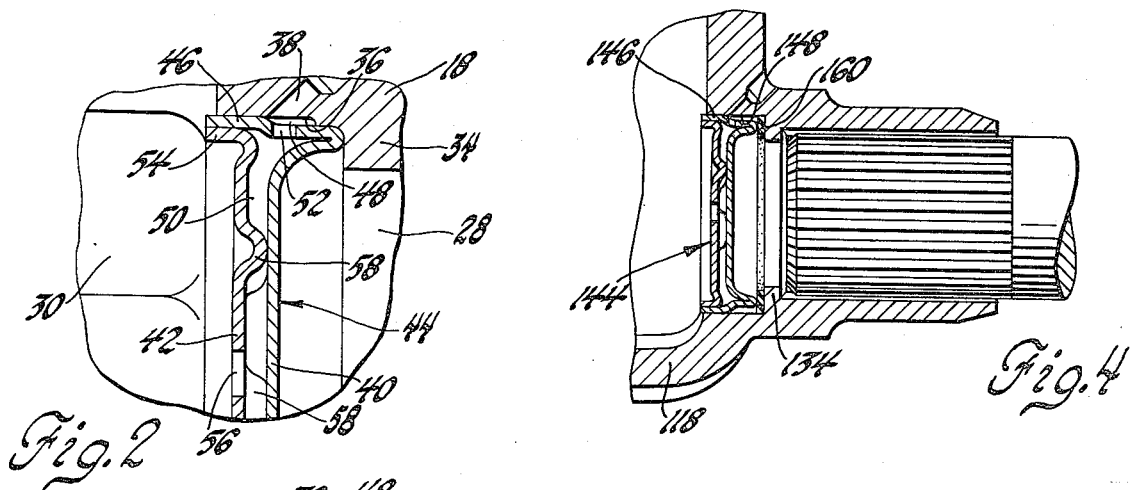
Fig.2
Fig.4
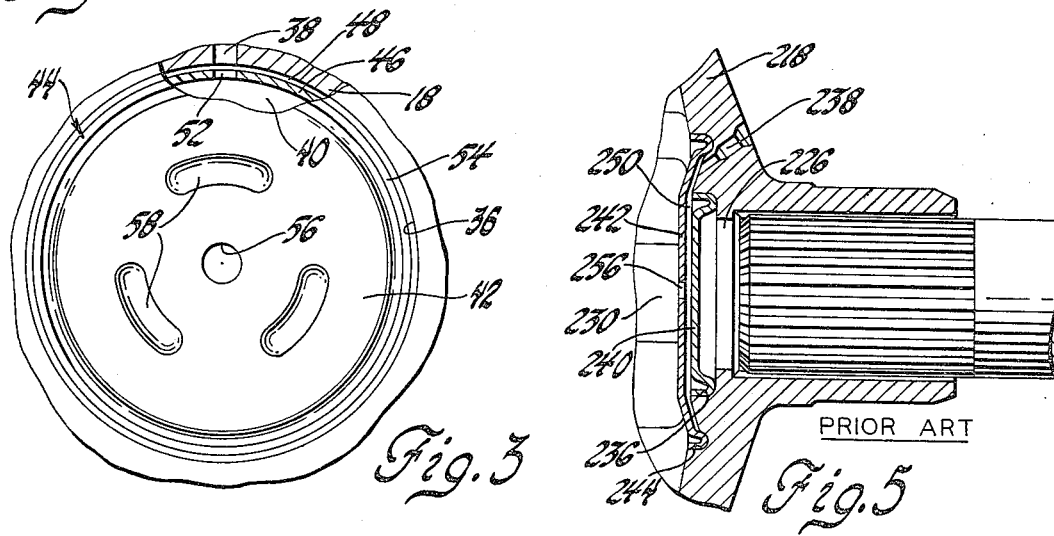
Fig.3
Fig.5  PRIOR ART

UNIVERSAL JOINT SEAL VENT

This invention relates generally to universal joints and more particularly to sealed universal joints having an outer drive member or housing which includes an attachment bore for connecting the housing to a drive shaft.

These housings are normally manufactured so that the attachment bore opens into the housing chamber in which working components of the universal joint are located. In such designs, a seal is needed at the inner end of the attachment bore to retain lubricant, usually grease, in the housing chamber as well as prevent contaminants from entering the housing chamber through the attachment bore. This seal usually takes the form of a stamped sheet metal seal disc pressed into a counterbore at the inner end of the attachment bore.

The housing chamber is normally partially filled with lubricant leaving an air space. In some instances, it is desirable to vent the housing chamber to minimize air pressure fluctuations due to expansion and contraction of the air space during operation of the universal joint. This is particularly true in stroking or plunging universal joints which use an elastomeric sealing boot which is attached to the housing and a drive shaft for the inner drive member of the universal joint.

In one known prior art design, illustrated in FIG. 5 of the accompanying sheet of drawing, the vent is provided by a stamped sheet metal vent disc which is mounted in a housing groove and spaced from the chamber side of the seal disc, and a generally radial vent hole through the housing wall which opens into the space between the two discs.

The object of this invention is to improve upon the multiple disc arrangement of the above known prior art device.

One feature of the invention is that the seal disc and vent disc are combined into a subassembly which facilitates assembly of the discs into the universal joint housing.

Another feature of the invention is a more effective labyrinth arrangement for preventing contaminants being ingested into the housing chamber through the vent passage.

Another feature of the invention is that the combined seal and vent discs are more compact and thus require less space in the universal joint housing.

Yet another feature of the invention is that the vent disc is reduced in diameter and consequently does not need as heavy a press fit to insure adequate retention in the event of an abnormal face pressure such as ice being formed between the vent and seal discs.

A further feature in connection with one embodiment of the invention is that the housing requires a single finished counterbore of uniform diameter for mounting the combined seal and vent discs.

Other objects and features of the invention will become apparent to those skilled in the art as the disclosure is made in the following detailed description of a preferred embodiment of the invention as illustrated in the accompanying sheet of drawing in which:

FIG. 1 is a longitudinal section through a universal joint having a seal vent arrangement in accordance with this invention.

FIG. 2 is an enlargement of a portion of FIG. 1.

FIG. 3 is a section taken substantially along the line 3—3 of FIG. 1 looking in the direction of the arrows.

FIG. 4 is a fragmentary longitudinal section through a universal joint having a seal vent arrangement in accordance with a second embodiment of this invention.

FIG. 5 is a fragmentary longitudinal section through a universal joint having the known prior art seal vent arrangement which has been described above.

Referring now to the drawing and more particularly to FIG. 1, there is disclosed a universal joint 10 having an inner drive member comprising a drive shaft 12, a three-legged spider 14 attached to the end of the drive shaft 12, and three drive balls 16 journalled on the respective legs of the spider 14. The outer drive member is in the form of a bell-shaped housing 18 having three internal longitudinal drive grooves 20 which receive respective ones of the drive balls 16. The housing 18 has a collar 22 at one end for attaching the housing 18 to a drive shaft 24. The opposite open end of housing 18 is sealed by an annular elastomeric boot 26 which has its large diameter end secured to the housing 18 and its small diameter end secured to the drive shaft 12.

The universal joint 10 is sometimes called a tri-pot joint. Its mode of operation which permits angulation as well as translation of the shaft 12 with respect to the housing 18 during joint rotation is well known. See for instance U.S. Pat. No. 2,910,845, entitled "Constant Velocity Joint", granted to Gunnar A. Wahlmark on Nov. 3, 1959.

The particular type universal joint 10 which is disclosed is for illustrative purposes only and it is to be understood that this invention is applicable to other types of universal joints, plunging or otherwise, where a vent is desired. With this in mind the seal vent arrangement of this invention will now be described in detail.

The collar 22 has a bore 28 which opens into a housing chamber 30 which includes the longitudinal drive grooves 20 and in which the spider 14 and drive balls 16 are located. The bore 28 has a splined outer end portion 32 for a splined driving connection with the drive shaft 24, an intermediate annular rib 34 and a stepped counterbore 36 at the inner end which opens into the chamber 30. The housing 18 has a small generally radial vent hole 38 which intersects the larger diameter portion of the stepped counterbore 36.

A seal disc 40 and a vent disc 42 are combined into a subassembly 44 which is press fitted in the stepped counterbore 36.

The seal disc 40 has a stepped outer rim 46. The two outer diameters of the stepped rim 46 are matched to the two diameters of the stepped counterbore 36 to provide a desired press fit at each diameter. The smaller diameter portion of the stepped rim 46, however, is considerably longer than the smaller diameter portion of the stepped counterbore 36 so that when the subassembly 44 is pressed into the stepped counterbore 36, the stepped outer rim 46 defines an outer annular vent chamber 48 in conjunction with the counterbore 36. The axial ends of the chamber 48 are sealed by the press fits of the two diameter portions of the rim 46 in the respective diameters of the counterbore 36.

The vent disc 42 is nested in the seal disc 40 to form an inner vent chamber 50 which communicates with the outer annular vent chamber 48 via holes 52 in the smaller diameter portion of the rim 46. The vent disc 42 has an outer rim 54 which is press fit in the larger diameter portion of the rim 46 for retaining the discs in nested assembly. The vent disc 42 has a central hole 56 and three arcuate circumferentially spaced depressions 58.

The hole 56 establishes communication between the inner vent chamber 50 and the housing chamber 30 and the depressions 58 engage the seal disc 40 to establish the axial spacing between the discs 40 and 42 and the width of the inner vent chamber 50. The seal disc 40 is preferably centralized with respect to the rim 46 by shaping the seal disc 40 as a concave dome. This reduces the width of the inner vent chamber 50 and also provides internal structure guarding the holes 52.

The vent disc 42 is preferably first pressed into the seal disc 40 to form the subassembly 44 which is then pressed into the counterbore 36. When the subassembly 44 is pressed into the counterbore 36, it provides a seal at the inner end of the bore 36 by reason of the press fit at the smaller diameter portion of the rim 46 and the imperforate nature of the dome-shaped seal disc 40.

The subassembly 44 also provides a vent passage between the housing chamber 30 and the exterior of the housing 18 via the hole 56, inner vent chamber 50, holes 52, outer vent chamber 48 and vent hole 38. This vent passage is an effective arrangement for preventing contaminants being ingested into the housing chamber 30 by reason of the extra barriers provided by the outer vent chamber 48 and the guarded holes 52.

The subassembly 44 is compact and requires little space in the universal joint housing. Moreover, since the vent disc 42 is smaller in diameter compared to the prior art device shown in FIG. 5, the press fit of the rim 54 need not be as heavy to ensure retention should ice or the like accumulate in the vent chamber 50.

FIG. 4 shows an alternate arrangement which requires a single finished counterbore 148 of uniform diameter in the universal joint housing 118 for mounting the seal vent subassembly 144. The seal vent subassembly 144 is the same as the previously described subassembly 44. In this design, an elastomeric face seal 160 is required between the outer axial end of the rim 146 and the rib 134.

FIG. 5 shows the known prior art design discussed in the introduction. This arrangement comprises separate seal and vent discs 240 and 242 which are separately and sequentially pressed into the counterbore 236 and mounting groove 244 respectively. When mounted in the universal joint housing 218 the separate discs provide a single vent chamber 250 intermediate the housing chamber 230 and the vent hole 238 through the housing wall. The seal disc 240 is imperforate and seals the inner end of the attachment bore 226. The vent disc 242 has a central hole 256 for establishing communication between the housing chamber 230 and the vent chamber 250.

We wish it to be understood that we do not desire to be limited to the exact details of construction shown and described, for obvious modifications will occur to a person skilled in the art.

The embodiments of the invention in which an exclusive property or privilege is claimed are defined as follows:

1. In a universal joint having a housing which includes an attachment bore which opens into a housing chamber via a counterbore at the inner end of the attachment bore and a generally radial vent hole which extends through a wall of the housing, the improvement comprising:
   a seal vent subassembly having an outer rim press fitted in the counterbore to form an outer vent chamber which is intersected by the vent hole which extends through the housing wall,
   said seal vent having a seal disc which seals an inner end of the attachment bore and a vent disc which forms an inner vent chamber in conjunction with the seal disc,
   said vent disc having a hole establishing communication between the housing chamber and the inner vent chamber, and
   said rim having a hole or holes establishing communication between said inner vent chamber and said outer vent chamber.

2. In a universal joint having a housing which includes an attachment bore which opens into a housing chamber via a counterbore at the inner end of the attachment bore and a generally radial vent hole which extends through a wall of the housing, the improvement comprising:
   a seal vent subassembly having an outer rim press fitted in the counterbore to form an outer vent chamber which is intersected by the vent hole which extends through the housing wall,
   said seal vent having a seal disc which is integrally attached to the rim and which seals an inner end of the attachment bore,
   said seal vent having a vent disc which is nested in the rim and which forms an inner vent chamber in conjunction with the seal disc,
   said vent disc having a hole establishing communication between the housing chamber and the inner vent chamber, and
   said rim having a hole or holes establishing communication between said inner vent chamber and said outer vent chamber.

3. In a universal joint having a housing which includes an attachment bore which opens into a housing chamber via a counterbore at the inner end of the attachment bore and a generally radial vent hole through the housing wall, the improvement comprising:
   a seal vent subassembly having a dome-shaped seal disc and a vent disc,
   said seal disc having a stepped outer rim press fitted in the counterbore to seal an inner end of the attachment bore and form an outer vent chamber which is intersected by the vent hole which extends through the housing wall,
   said vent disc having an outer rim press fitted in the stepped outer rim of the seal disc and forming an inner vent chamber in conjunction with the seal disc,
   said vent disc having a hole establishing communication between the housing chamber and the inner vent chamber and depressions engaging the seal disc to establish the width of the inner vent chamber, and
   said stepped outer rim having a hole or holes which establish communication between said inner vent chamber and said outer vent chamber and which are guarded by portions of the dome-shaped seal disc.

4. The improvement as defined in claim 3 wherein the counterbore at the inner end of the attachment bore is stepped and wherein the stepped outer rim has its two outer diameters press fitted in the respective diameters of the stepped counterbore.

5. The improvement as defined in claim 3 wherein the counterbore at the inner end of the attachment bore is of uniform diameter and wherein an elastomeric face seal is provided at the outer axial end of the stepped outer rim.

* * * * *